United States Patent
Song et al.

(10) Patent No.: US 7,612,339 B2
(45) Date of Patent: Nov. 3, 2009

(54) OPTOCONDUCTIVE COMPOUND AND METHOD OF PRODUCING THE SAME

(75) Inventors: Kibong Song, Daejeon (KR); Kyeongam Kim, Daejeon (KR); Sang Su Lee, Daejeon (KR); Doo-Hee Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 7 days.

(21) Appl. No.: 11/950,650

(22) Filed: Dec. 5, 2007

(65) Prior Publication Data
US 2008/0185528 A1    Aug. 7, 2008

(30) Foreign Application Priority Data
Dec. 5, 2006   (KR)   ............... 10-2006-0122564
May 4, 2007   (KR)   ............... 10-2007-0043803

(51) Int. Cl.
*G01J 5/00*    (2006.01)
(52) U.S. Cl. .................................................. 250/338.1
(58) Field of Classification Search ... 250/338.1–338.5; 427/76
See application file for complete search history.

(56) References Cited

U.S. PATENT DOCUMENTS

| | | | | |
|---|---|---|---|---|
| 4,709,466 A | * | 12/1987 | McCandless et al. | ......... 438/94 |
| 5,142,605 A | | 8/1992 | Diemeer et al. | |
| 5,981,868 A | * | 11/1999 | Kushiya et al. | ............. 136/262 |
| 6,281,426 B1 | * | 8/2001 | Olson et al. | .................. 136/249 |
| 2004/0219730 A1 | * | 11/2004 | Basol | ......................... 438/200 |
| 2006/0207644 A1 | * | 9/2006 | Robinson et al. | ............ 136/243 |

FOREIGN PATENT DOCUMENTS

KR    1990-0005634    4/1990

OTHER PUBLICATIONS

Rolf Brendel, et al.; "15.4%-efficient and 25 um-thin crystalling Si solar cell from layer transfer using porous silicon;" phys.stat.sol. (a) 197, No. 2, pp. 497-501 (2003) DOI 10.1002/pssa.200306552.
K.D. Rogers, et al.; "The crystal structure of CdS-CdTe thin film heterojunction solar cells;" Thin Solid Film 339 (1999) pp. 299-304.
Miguel A Contreras, et al; "Progress Toward 20% Efficiency in Cu(In,Ga)Se2 Polycrystalline Thin-film Solar Cells;" Progress in Photovoltaics: Research and Applications, Prog. Photovolt: Res. Appl.7, pp. 311-316 (1999).

* cited by examiner

*Primary Examiner*—David P Porta
*Assistant Examiner*—Kiho Kim
(74) *Attorney, Agent, or Firm*—Ladas & Parry LLP

(57) ABSTRACT

Conventional optoconductive compounds, such as CIS or CdTe include scarce indium or environmentally-unfriendly cadmium. On the other hand, an optoconductive compound according to the present invention has high optoconductive efficiency without inclusion of indium and cadmium, wherein the optoconductive compound according to the present invention is represented by AXYY' where A is a Group 11 element, X is a Group 15 element, and Y and Y' are Group 16 elements in which Y and Y' can be identical to or different from each other.

6 Claims, 4 Drawing Sheets

OPTOCONDUCTIVE COMPOUND AND METHOD OF PRODUCING THE SAME

CROSS-REFERENCE TO RELATED PATENT APPLICATIONS

This application claims the benefit of Korean Patent Application No. 10-2006-0122564, filed on Dec. 5, 2006, and Korean Patent Application No. 10-2007-0043803, filed on May 4, 2007 in the Korean Intellectual Property Office, the disclosure of which are incorporated herein in its entirety by reference.

BACKGROUND OF THE INVENTION

1. Field of the Invention

The present invention relates to an optoconductive compound and a method of producing the same, and more particularly, to an optoconductive compound having high optoconductive efficiency without inclusion of scarce indium (In) or environmentally-unfriendly cadmium (Cd) therein and a method of producing the same.

2. Description of the Related Art

Silicon has relatively higher illumination efficiencies than other optoconductive materials that can be used in solar cells, but deteriorates when exposed to sunlight for a long period of time. Therefore, CIS(CuInSe$_2$) and CIGS(CuInGaSe) are being developed to replace silicon for use in a solar cell.

CIS and CIGS both are types of direct-transition semiconducting compounds, and have optical absorption coefficients as high as $1\times10^5$ cm$^{-1}$ and high electro-optical stability. However, when CIS and CIGS are formed in a thin layer, their compositions should be precisely adjusted using, for example, an expensive effusion cell. So, it is difficult to obtain a large-area thin layer of CIS or CIGS. In addition, those compounds require indium (In) which is scarce.

Meanwhile, highly-sensitive CdTe compound has relatively high illumination efficiency, but contains cadmium (Cd) which is an environmentally unfriendly heavy metal. Due to these problems, development of a novel optoconductive material is required.

That is, there is a need to develop an optoconductive compound having excellent optoconductive properties without inclusion of indium or cadmium.

SUMMARY OF THE INVENTION

The present invention provides an optoconductive compound having high optoconductive efficiency without inclusion of scarce indium (In) or environmentally-unfriendly cadmium (Cd) therein.

The present invention also provides a method of producing an optoconductive compound having high optoconductive efficiency without inclusion of scarce In or environmentally-unfriendly Cd therein.

The present invention also provides an optoconductive device including the optoconductive compound.

According to an aspect of the present invention, there is provided an optoconductive compound represented by AXYY' where A is a Group 11 element, X is a Group 15 element, and Y and Y' are Group 16 elements, wherein Y and Y' can be identical to or different from each other.

The optoconductive compound can be crystalline. The A can be copper (Cu). The X can be arsenic (As). The Y can be sulfur (S) and the Y' can be selenium (Se). Optionally, the A is copper (Cu), the X is arsenic (As), the Y is sulfur (S), and the Y' is selenium (Se).

An optical bandgap of the optoconductive compound can exist between 1.38 eV and 1.65 eV at 20° C. The optoconductive compound can have peaks 2θ between 43° and 45° and between 63° and 65° in its X-ray diffraction results.

According to another aspect of the present invention, there is provided a method of producing an optoconductive compound, the method including: depositing a first material represented by $X_2Y_3$ on a substrate; depositing a second material represented by $AY'_2$ on the first material; and performing a heat treatment on the first material and the second material, wherein A is a Group 11 element, X is a Group 15 element, and Y and Y' are Group 16 elements, wherein Y and Y' can be identical to or different from each other.

The first material can be represented by $As_2S_3$. The second material can be represented by $CuSe_2$.

The heat treatment can be performed at a temperature of from 200° C. to 300° C.

The first material can be amorphous, and the second material can be crystalline.

According to an aspect of the present invention, there is provided an optoconductive device including the optoconductive compound.

The optoconductive device includes a substrate, a light absorption layer formed on the substrate, a bottom electrode formed between the substrate and the light absorption layer, a buffer layer formed on the light absorption layer, a window layer formed on the buffer layer, and a grid electrode formed on the window layer, in which the light absorption layer comprises the optoconductive compound.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
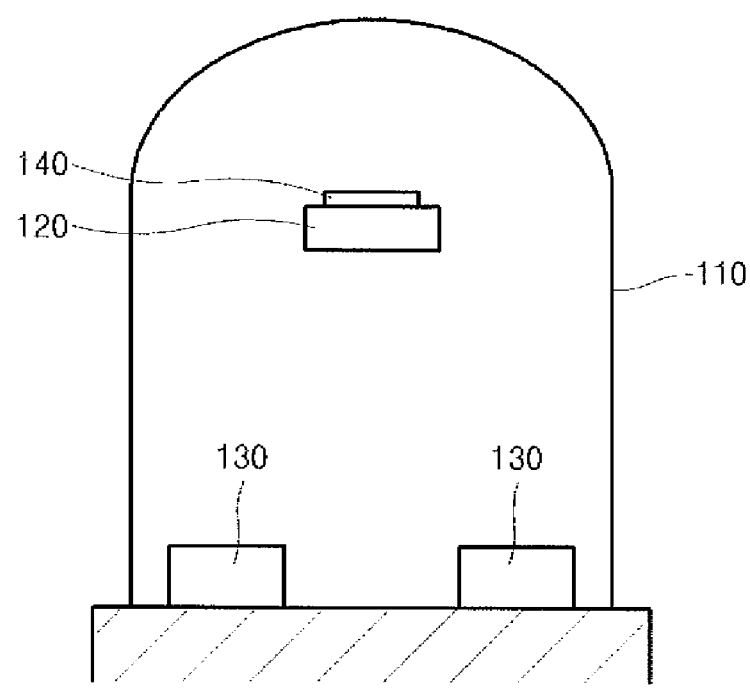
FIG. 1 is a conception diagram illustrating an equipment for producing an optoconductive compound according to the present invention.

The present invention will now be described more fully with reference to the accompanying drawings, in which exemplary embodiments of the invention are shown.

An optoconductive compound according to the present invention can be represented by AXYY' where A can be a Group 11 element, such as copper (Cu), silver (Ag), or gold (Au), and specifically, copper (Cu); X can be a Group 15 element, such as nitrogen (N), phosphor (P), arsenic (As), antimony (Sb), or bismuth (Bi), and specifically, arsenic (As); and Y and Y' can be a Group 16 element, such as oxygen (O), sulfur (S), selenium (Se), tellurium (Te), or polonium (Po), and specifically, sulfur (S) or selenium (Se), in which Y and Y' can be identical to or different from each other.

The optoconductive compound is a crystalline solid and has 2θ peaks between 43° and 45° and between 63° and 65° in results obtained by X-ray diffraction (XRD). An optical bandgap of the optoconductive compound according to the present invention exists between about 1.38 eV and about 1.65 eV at 20° C.

The optoconductive compound can be formed on, for example, a substrate. The substrate can be a glass substrate; a ceramic substrate, such as an alumina substrate; a metal substrate, such as a stainless steel substrate or a copper tape; or a polymer substrate, such as a polyimide substrate.

The optoconductive compound represented by AXYY' may have an atomic ratio such as $A_a X_x Y'_{y1} Y'_{y2}$ where a:x:(y1+y2) is 1:1:2. Such an atomic ratio is obtained in consideration of valence electrons of each atom.

A method of producing the optoconductive compound according to an embodiment of the present invention will now be described in detail.

First, a first material represented by $X_2 Y_3$ is deposited on a substrate. X of the first material can be a Group 15 element, such as nitrogen (N), phosphor (P), arsenic (As), antimony (Sb), or bismuth (Bi). Y of the first material can be a Group 16 element, such as oxygen (O), sulfur (S), selenium (Se), tellurium (Te), or polonium (Po). For example, the first material can be $As_2 S_3$, but is not limited thereto.

The substrate can be a glass substrate; a ceramic substrate, such as an alumina substrate; a metal substrate, such as a stainless steel substrate or a copper tape; or a polymer substrate, such as a polyimide substrate.

The first material can be deposited on the substrate using any known deposition method, such as an evaporation method, a sputtering method, an electrodeposition method. However, the deposition method is not limited to those methods described above.

Then, a second material represented by $AY'_2$ is deposited on the deposited first material. A of the second material can be a Group 11 element, such as copper (Cu), silver (Ag), or gold (Au), and Y' of the second material can be a Group 16 element, such as oxygen (O), sulfur (S), selenium (Se), tellurium (Te), or polonium (Po). Y of the first material can be identical to or different from Y' of the second material. For example, the second material can be $CuSe_2$, but is not limited thereto.

The second material can be deposited on the first material using any known deposition method, such as an evaporation method, a sputtering method, or an electrodeposition method. However, the deposition method is not limited to those methods described above.

Then, the first material and the second material are subjected to a heat treatment. The heat treatment can be performed at a temperature of from 200° C. to 300° C. When the heat treatment temperature is less than 200° C., the counter-diffusion of the first material and the second material may not be sufficient and an optoconductive compound according to the present invention may not be formed. On the other hand, when the heat treatment temperature is higher than 300° C., the production process is expensive.

The heat treatment can be performed in such a temperature range for 10 minutes to 40 minutes. When the heat treatment is performed for less than 10 minutes, an optoconductive compound according to the present invention may be insufficiently formed. On the other hand, when the heat treatment is performed for more than 40 minutes, the effect of the heat treatment is satisfied and the production process is uneconomical.

Through the heat treatment, an optoconductive compound according to the present invention can be obtained.

An optoconductive device including the optoconductive compound according to an embodiment of the present invention will now be described in detail.

The optoconductive device can include a substrate, a light absorption layer formed on the substrate, a bottom electrode formed between the substrate and the light absorption layer, a buffer layer formed on the light absorption layer, a window layer formed on the buffer layer, and a grid electrode formed on the window layer, in which the light absorption layer can include the optoconductive compound.

Figure 5:
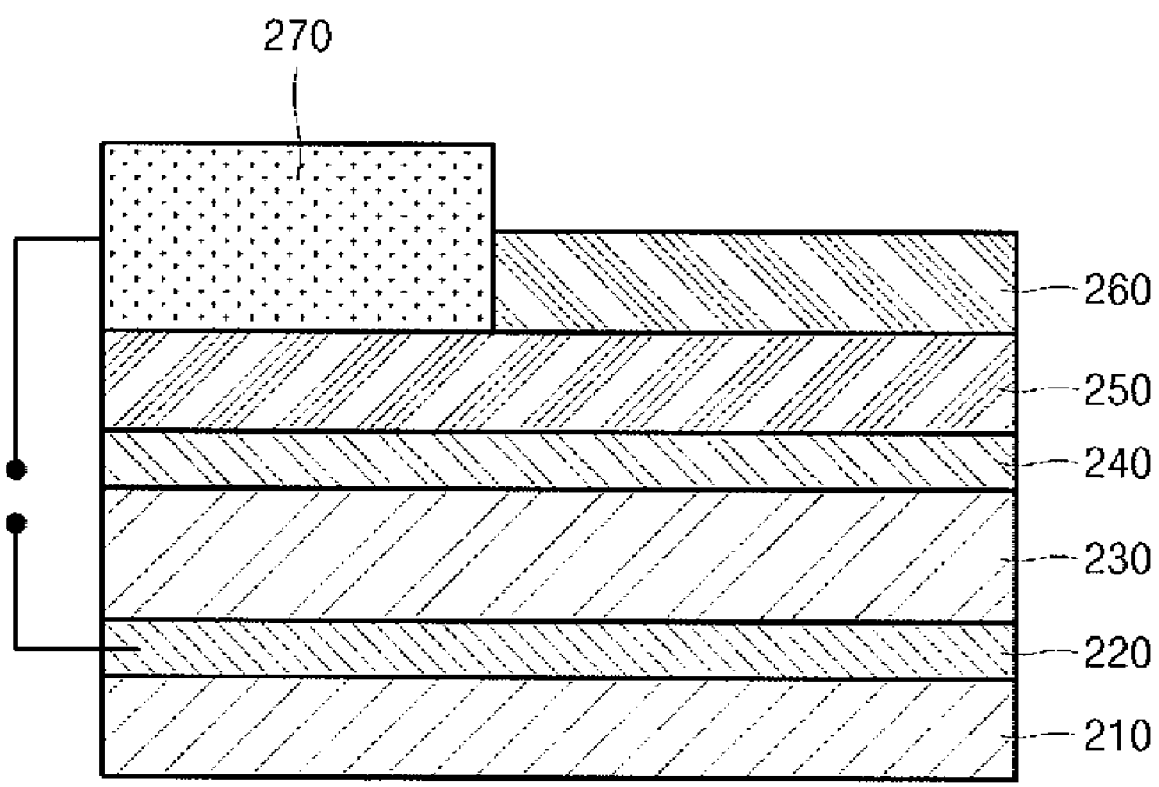
FIG. 5 is a conception diagram illustrating an optoconductive device including an optoconductive compound according to the present according to an embodiment of the present invention.

Referring to FIG. 5, a light absorption layer 230 is formed on a substrate 210. The light absorption layer 230 includes the optoconductive compound and substantially absorbs external light to generate a current.

A window layer 250 is formed on the light absorption layer 230. The window layer 250 should have high light transmittance and high electroconductivity so as to act as a transparent electrode. The window layer 250 can be, for example, a ZnO layer or a double layer of a ZnO layer and an indium tin oxide (ITO) layer deposited on the ZnO layer.

Meanwhile, the light absorption layer 230 may be insufficiently combined with the window layer 250 due to a large difference of the lattice constant and energy band gaps between the light absorption layer 230 and the window layer 250. In order to address this problem, a buffer layer 240 can be formed between the light absorption layer 230 and the window layer 250.

The optoconductive device can include a antireflection layer 260 to obtain high efficiency by reducing reflection of an incident light. The optoconductive device can include a grid electrode 270 and a bottom electrode 220 to collect a current generated in the optoconductive device. Specifically, the bottom electrode 220 can be formed between the substrate 210 and the light absorption layer 230.

The present invention will be described in further detail with reference to the following examples. These examples are for illustrative purposes only and are not intended to limit the scope of the present invention.

EXAMPLE

FIG. 1 is a diagram illustrating equipment for producing an optoconductive compound according to the present invention. Referring to FIG. 1, a substrate holder 120 is located inside a vacuum chamber 110. In Example the pressure in the vacuum chamber 110 was maintained to $10^{-6}$ torr or lower.

The substrate holder 120 supports a substrate 140 to be disposed thereon and heats the substrate 140 in a subsequent heat treatment process. That is, the substrate holder 120 has a heating structure therein.

A substrate 140 was positioned above the substrate holder 120. The substrate 140 was a washed glass substrate.

A target 130 was positioned in a lower part of the vacuum chamber 110. The target 130 itself can be positioned. Alternatively, the target 130 can be positioned being contained in a tungsten (W)-boat, or the target 130 can be positioned in a form of an effusion cell. Meanwhile, use of a W-boat is appropriate to deposit a sample in a large area. So, in the current example, an $As_2 S_3$ target and a $CuSe_2$ target were positioned by being respectively contained in two W-boats First, the $As_2 S_3$ target was evaporated by heating in order to deposit an $As_2 S_3$ layer on the substrate 140. Then, the $CuSe_2$ target was evaporated by heating in order to deposit a $CuSe_2$ layer on the substrate 140 with $As_2 S_3$ deposited thereon.

Then, the temperature of the substrate 140 was increased to a temperature of 250° C. for about 15 minutes using a heating device in the substrate holder 120. The temperature of the substrate 140 was maintained to 250° C. for 10 minutes and then cooled to room temperature. As a result, an optoconductive compound layer of CuAsSSe was formed.

Figure 2:
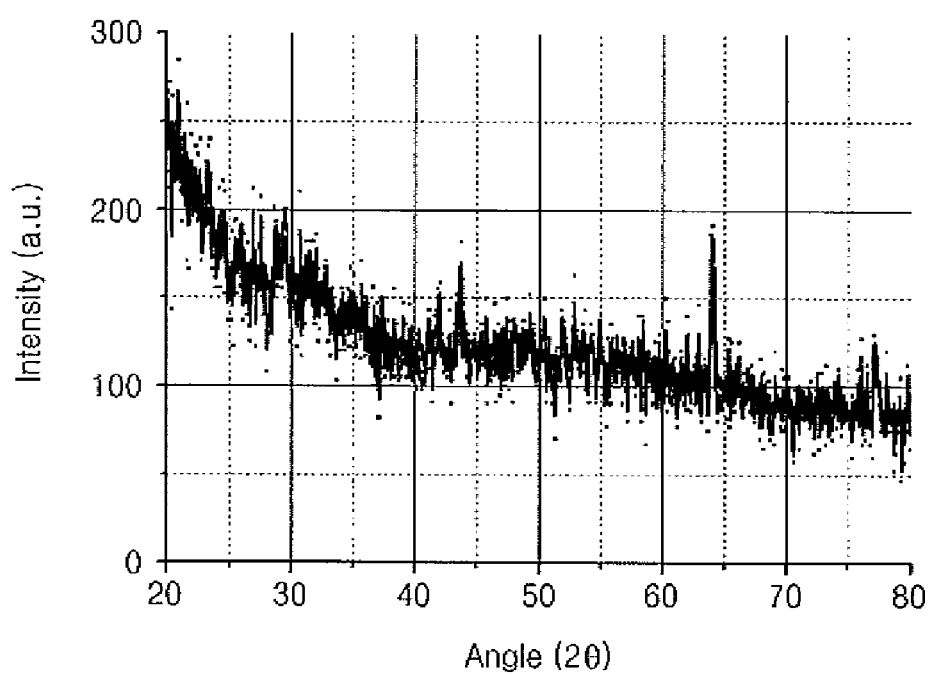
FIG. 2 is a graph showing results of X-ray diffraction (XRD) experiments performed on an optoconductive compound according to the present invention.

The optoconductive compound layer formed as described above was identified through an XRD experiment and its XRD pattern was obtained. The results are shown in FIG. 2. Referring to FIG. 2, 2θ peaks appear between 43° and 45° and between 63° and 65°. Specifically, the first material $As_2S_3$ is amorphous and thus does not have peaks, and the second material $CuSe_2$ is crystalline and has peaks at 27°, 28°, 31°, 32°, 46°, 47°, 50°, 57°, and 71°. Therefore, it was identified that an optoconductive compound having a novel crystalline structure was produced using the method described above.

Figure 3:
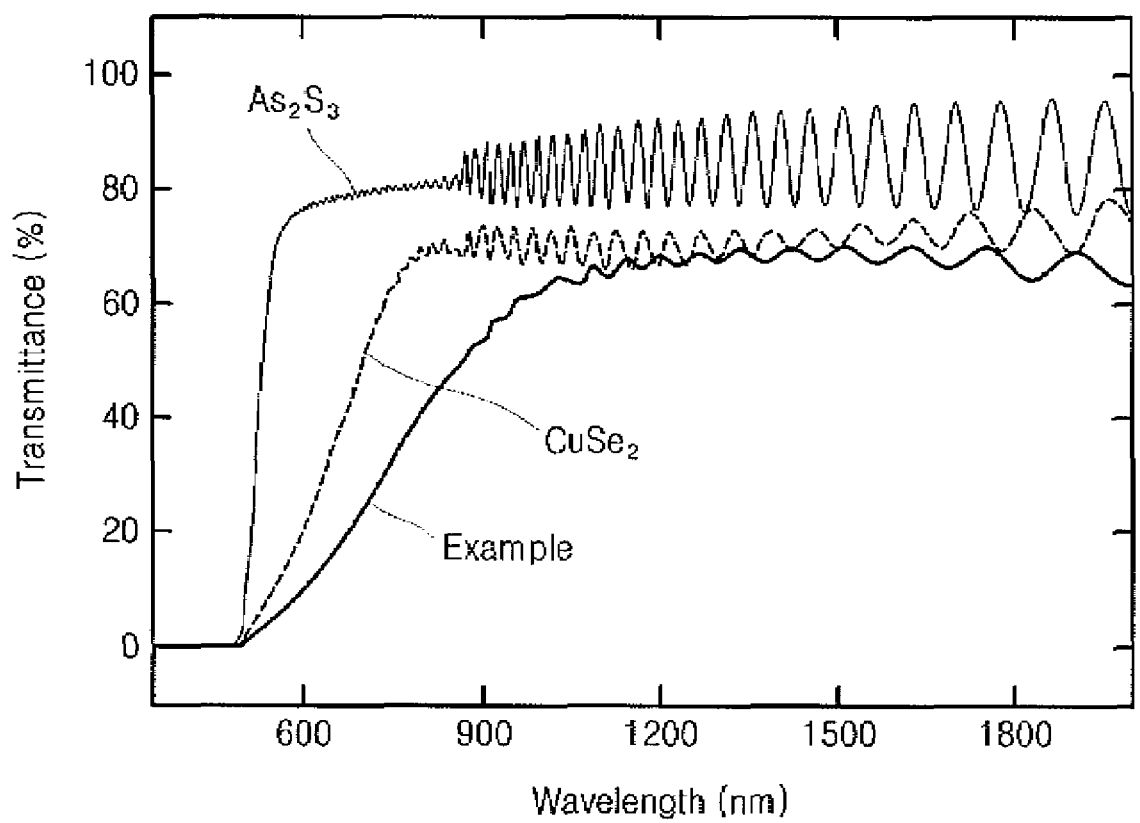
FIG. 3 is a graph showing light-transmission characteristics of an optoconductive compound according to the present invention, an $As_2S_3$ layer, and a $CuSe_2$ layer.

Meanwhile, optical characteristics of the produced optoconductive compound layer were identified by measuring light transmission characteristics of the optoconductive compound prepared according to Example, the $As_2S_3$ layer, and the $CuSe_2$ layer. The results are shown in FIG. 3. Referring to FIG. 3, the light transmission characteristic of the optoconductive compound prepared according to Example is very different from those of the $As_2S_3$ layer and the $CuSe_2$ layer.

In addition, it was identified that the optical bandgap of the optoconductive compound prepared according to Example exists between about 1.38 eV and about 1.65 eV at 20° C.

Figure 4:
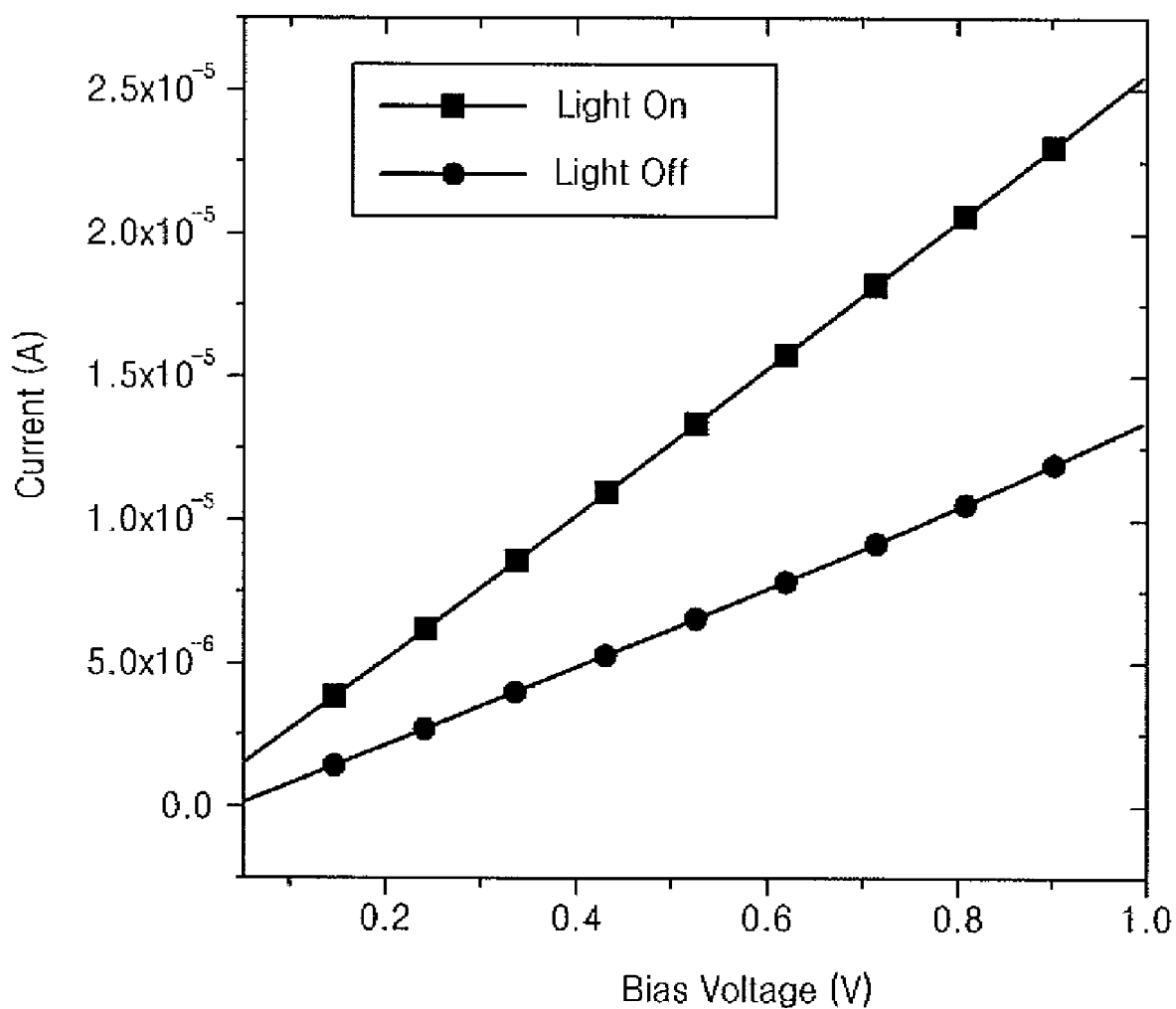
FIG. 4 is a graph showing optoconductive characteristics of an optoconductive compound according to the present invention.

FIG. 4 is a graph showing optoconductive characteristics of an optoconductive device including the optoconductive compound described above. Referring to FIG. 4, the amount of a current is greater when light was irradiated than when light was not irradiated, while a bias voltage is supplied. Therefore, optoconductive properties of an optoconductive compound according to the present invention can be identified.

An optoconductive compound according to the present invention has high optoconductive efficiency without inclusion of scarce indium or environmentally-unfriendly cadmium, and thus, an optoconductive device including the optoconductive compound can be formed having excellent properties.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of producing an optoconductive compound, the method comprising:
   depositing a first material represented by $X_2Y_3$ on a substrate;
   depositing a second material represented by $AY'_2$ on the first material; and
   performing a heat treatment on the first material and the second material, wherein A is a Group 11 element, X is a Group 15 element, and Y and Y' are Group 16 elements, wherein Y and Y' can be identical to or different from each other.

2. The method of claim 1, wherein the first material is represented by $As_2S_3$.

3. The method of claim 1, wherein the second material is represented by $CuSe_2$.

4. The method of claim 1, wherein the heat treatment is performed at a temperature of from 200° C. to 300° C.

5. The method of claim 1, wherein the first material is amorphous.

6. The method of claim 1, wherein the second material is crystalline.

* * * * *